(12) United States Patent
Lawless et al.

(10) Patent No.: US 12,194,858 B2
(45) Date of Patent: Jan. 14, 2025

(54) SYSTEMS AND METHODS FOR PROVIDING POWER TO AN ELECTRIC MOTOR FROM AN INVERTER

(71) Applicant: Toyota Motor Engineering & Manufacturing North America, Inc., Plano, TX (US)

(72) Inventors: Patrick Francis Lawless, Ann Arbor, MI (US); Luke A. Rippelmeyer, Plano, TX (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 182 days.

(21) Appl. No.: 17/968,346

(22) Filed: Oct. 18, 2022

(65) Prior Publication Data

US 2023/0120122 A1   Apr. 20, 2023

Related U.S. Application Data (60) Provisional application No. 63/257,850, filed on Oct. 20, 2021.

(51) Int. Cl.
| | |
|---|---|
| *B60L 1/00* | (2006.01) |
| *B60L 3/00* | (2019.01) |
| *G05B 19/05* | (2006.01) |
| *H02J 13/00* | (2006.01) |
| *H02P 1/54* | (2006.01) |

(52) U.S. Cl.
CPC ............ *B60L 1/003* (2013.01); *B60L 3/003* (2013.01); *G05B 19/05* (2013.01); *H02J 13/00032* (2020.01); *H02P 1/54* (2013.01)

(58) Field of Classification Search
None
See application file for complete search history.

(56) References Cited

U.S. PATENT DOCUMENTS

| | | | |
|---|---|---|---|
| 8,456,877 B2 | 6/2013 | Angerer et al. | |
| 9,071,086 B2 | 6/2015 | Lee | |
| 9,864,664 B2 | 1/2018 | Gonzalez et al. | |
| 9,889,765 B2 | 2/2018 | Manabe et al. | |
| 10,727,554 B2 | 7/2020 | Oya | |
| 2005/0035676 A1* | 2/2005 | Rahman ............... | B60L 15/08 |
| | | | 180/65.6 |
| 2015/0207448 A1* | 7/2015 | Ono ..................... | H02P 9/48 |
| | | | 318/139 |
| 2019/0092180 A1* | 3/2019 | Zhu ..................... | B60L 50/51 |
| 2019/0111909 A1* | 4/2019 | Shimizu ............ | B60W 30/1843 |
| 2021/0188066 A1 | 6/2021 | McGrew et al. | |
| 2023/0159040 A1* | 5/2023 | Kamio ................. | B60L 3/003 |
| | | | 701/99 |

* cited by examiner

*Primary Examiner* — Jared Fureman
*Assistant Examiner* — Joel Barnett
(74) *Attorney, Agent, or Firm* — Christopher G. Darrow; Darrow Mustafa PC (57) ABSTRACT

Disclosed are systems, methods, and devices for configuring the output provided by an inverter to an electric motor based on the position of the electric motor with respect to another electric motor.

20 Claims, 3 Drawing Sheets

SYSTEMS AND METHODS FOR PROVIDING POWER TO AN ELECTRIC MOTOR FROM AN INVERTER

CROSS-REFERENCE TO RELATED APPLICATION

This application claims priority to U.S. Provisional Patent Application No. 63/257,850 filed Oct. 20, 2021, the contents of which are hereby incorporated by reference in its entirety.

TECHNICAL FIELD

The subject matter described herein relates, in general, to systems and methods for providing power to an electric motor from an inverter based on the position of the electric motor with respect to another electric motor.

TECHNICAL FIELD

The background description provided is to present the context of the disclosure generally. Work of the inventor, to the extent it may be described in this background section, and aspects of the description that may not otherwise qualify as prior art at the time of filing, are neither expressly nor impliedly admitted as prior art against the present technology.

A power inverter, sometimes referred to as an inverter, is a power electronic device or circuit that changes one type of current, such as direct-current (DC), to another type of current, such as alternating current (AC). Three-phase inverters are used for variable frequency drive applications, such as controlling electric motors. A basic three-phase inverter generally includes three single-phase inverter switches, each connected to one of three load terminals. The operation of the three switches is coordinated by a controller so that one switch operates at each 60-degree point of the fundamental output waveform. This creates a line-to-line output waveform that has six steps. The six-step waveform has a zero-voltage step between the positive and negative sections of the square wave such that the harmonics that are multiples of three are eliminated.

Electric, hybrid electric, plug-in hybrid electric, and/or fuel cell vehicles utilize electric motors to provide propulsion. Current from a DC source, such as a battery and/or fuel cell system, is converted using a three-phase inverter to drive an electric motor. However, the type of inverter and the configuration of the electric motor plays a critical role in determining the direction that the electric motor rotates an output shaft that drives one or more wheels via transmission.

SUMMARY

This section generally summarizes the disclosure and does not comprehensively explain its full scope or all its features.

In one example, a method for configuring an inverter for driving an electric motor includes the steps of determining a motor position of the electric motor with respect to another electric motor and adjusting the output of the configurable inverter based on the motor position of the electric motor.

In another example, a vehicle includes first and second electric motors connected to an output shaft and configured to rotate the output shaft. The first and second motors generally face each other. Each electric motor is connected to an inverter configured to selectively output a three-phase AC output to its respective electric motor. A controller is connected to the inverters and is configured to determine the electric motors' positions and adjust the three-phase AC outputs provided to the electric motors based on their positions.

In yet another example, a configurable inverter includes a power circuit configured to receive a current from a DC source and convert the current from the DC source into a three-phase AC output. The configurable inverter also includes a controller in communication with the power circuit and is configured to selectively output the three-phase AC output to an electric motor. The controller also receives a motor position input from the electric motor indicating the position of the electric motor. Based on the motor position input, the controller is configured to modify the three-phase AC output provided to the electric motor.

Further areas of applicability and various methods of enhancing the disclosed technology will become apparent from the description provided. The description and specific examples in this summary are intended for illustration only and do not limit the scope of the present disclosure.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

As explained in the background section, electric vehicles, hybrid electric vehicles, plug-in hybrid electric vehicles, fuel cell vehicles, and the like, may have one or more electric motors that drive one or more wheels of the particular vehicle via a transmission. These electric motors are driven by inverters that convert current from a DC source, such as a fuel cell system and/or battery, to a three-phase AC output. This three-phase AC output is then selectively provided to the electric motors, which causes the electric motors to rotate an output shaft that is connected to the transmission that drives the vehicle's wheels.

One particular advantageous configuration of the electric motors is a configuration wherein two electric motors are connected to the same output shaft and face each other. This configuration allows for a compact design and allows two electric motors to be connected to the same output shaft. Vehicles having significant torque requirements, such as tractor-trailers, can have the advantage of having two electric motors to meet these significant torque requirements.

However, because the electric motors face each other, the control of these motors may need to be coordinated such that when one electric motor is rotating the shaft clockwise, the other electric motor should be rotating the shaft counterclockwise. Because the electric motors face each other, if both electric motors attempt to rotate the shaft in the same direction, such as clockwise, the electric motors will provide torque to the shaft in opposite directions, causing either damage to the vehicle or preventing the vehicle from moving.

As such, the inverters for each of the electric motors should selectively provide their respective three-phase AC output to their electric motor appropriately. The following paragraphs describe systems and methods that adjust the output of an inverter based on the position of the electric motor with respect to another electric motor. This prevents situations wherein the wrong inverter is connected to the wrong motor.

Figure 1:
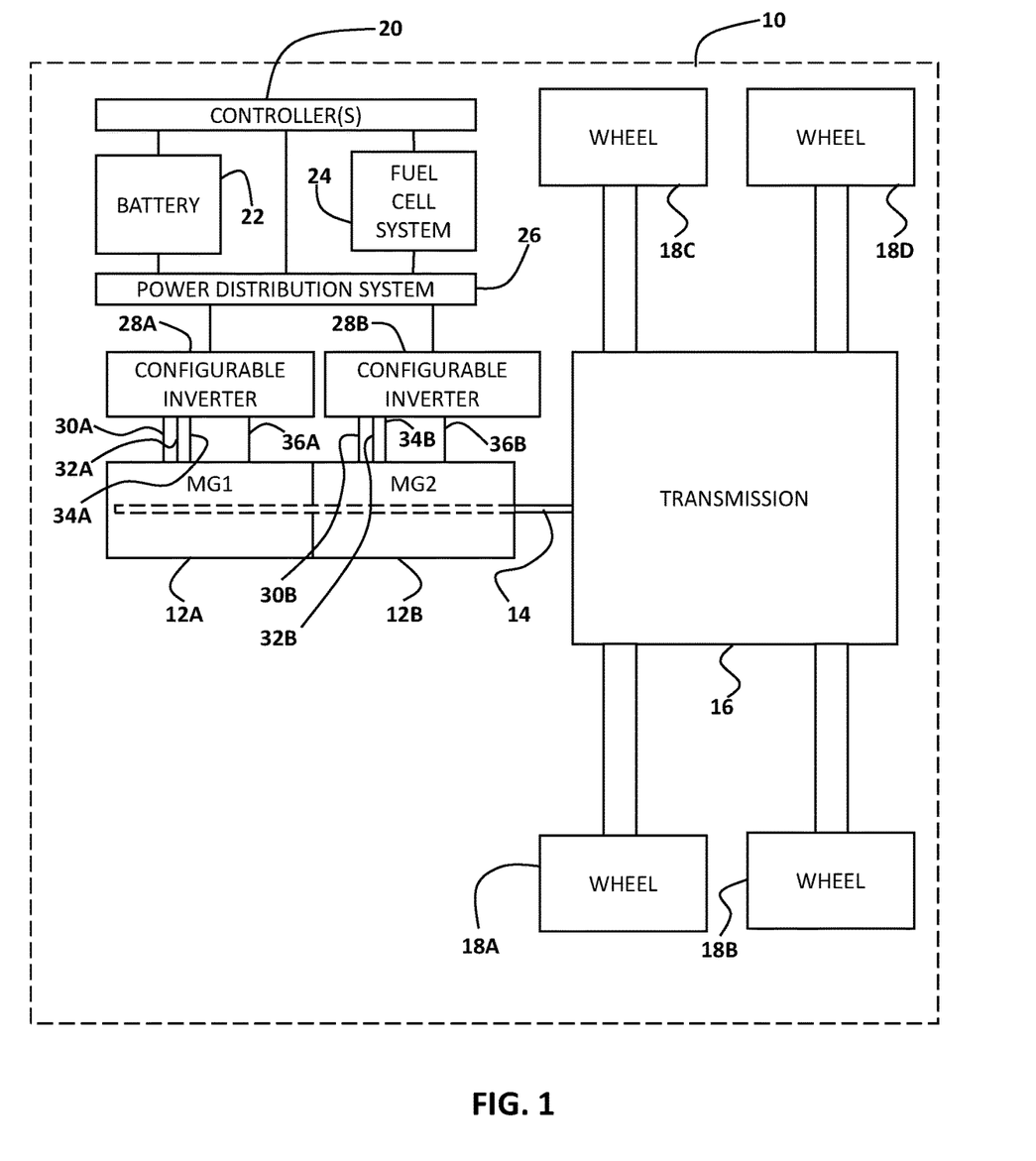
FIG. 1 illustrates a block diagram of a vehicle having two electric motors connected to an output shaft and configurable inverters connected to each of the electric motors.

Referring to FIG. 1, illustrated is one example of a vehicle 10 incorporating a system and method for providing power to one or more electric motors using inverters. It should be understood that the vehicle 10 can be any form of power transport that utilizes one or more electric motors. For example, the vehicle 10 can be an automobile, truck, semi, tractor, farming machinery, military equipment, mining vehicle, and the like. The vehicle 10 may be a traditional vehicle that requires inputs from a driver or may be an autonomous or semi-autonomous vehicle that can perform some or all actions regarding piloting the vehicle 10.

In this example, the vehicle 10 includes electric motors 12A and 12B that are connected to an output shaft 14. The electric motors 12A and 12B convert electrical energy into mechanical energy through the interaction between the magnetic field and electrical current in a wire winding in each of the electric motors 12A and 12B. In this example, the electric motors 12A and 12B are orientated such that they face each other. However, it should be understood that the electric motors 12A and 12B may be orientated differently, such as facing in opposite or the same direction. In situations where the electric motors 12A and 12B face towards each other or when the electric motor 12A rotates the output shaft 14 in a clockwise motion, the electric motor 12B may be rotating the output shaft in a counterclockwise motion.

The electric motors 12A and 12B may be similar to each other in that they may rotate in a similar direction when the same three-phase AC output is provided to the appropriate supply lines 30A-34A and 30B-34B, respectively. More simply, they may have the same direction phase sequence. When the electric motors 12A and 12B are orientated in the same direction, the same three-phase AC output will cause the electric motors 12A and 12B to rotate in the same direction. If the electric motors 12A and 12B face towards each other or away from each other in the same three-phase AC output is provided to the electric motors 12A and 12B, the electric motors 12A and 12B will try to rotate the output shaft 14 in opposite directions, essentially canceling each other out. As will be explained in greater detail in the specification, the configurable inverters 28A and 28B can determine which electric motors 12A and 12B they are connected to and configure themselves such that one of the configurable inverters 28A and 28B will change the output to the supply line such that the electric motors 12A and 12B will rotate in opposite directions.

The output shaft 14 is connected to a transmission 16, which can include any one of a number of different components for transferring power received from the output shaft 14 to one or more wheels 18A-18B of the vehicle 10. In one example, the transmission 16 may include one or more reduction gears and a differential. However, it should be understood that the transmission 16 can vary based on the type of application and should not be limited to just the description given in this disclosure.

The vehicle 10 may also include one or more power sources for providing a current to the electric motors 12A and/or 12B. In one example, the vehicle 10 includes a battery 22 and a fuel cell system 24. The battery 22 can be any type of battery capable of storing electricity. In one example, the battery 22 may include cells using different electrical storage technologies, such as lithium-ion, nickel-metal hydride, lead-acid, and the like. It should be understood that the type of technology that the battery 22 utilizes can vary from application to application and can change as battery storage technology develops.

As stated in the paragraph above, the vehicle 10 may also include a fuel cell system 24. However, the vehicle 10 does not necessarily need to include a fuel cell system 24. As such, the vehicle 10 could be a traditional electrical vehicle, a hybrid electric vehicle, or a plug-in hybrid electric vehicle—none of which may include the fuel cell system 24. If the vehicle 10 includes the fuel cell system 24, the fuel cell system 24 may include one or more fuel cells that convert the chemical energy of a fuel and an oxidizing agent into electricity through a pair of redox reactions. In one example, the fuel may be hydrogen, and the oxidizing agent may be oxygen from the air. When this reaction occurs, the fuel cell system 24 can generate electricity that may be in the form of DC electricity.

Electricity generated by the fuel cell system 24 can be provided to a power distribution system 26 that can either store the electricity generated by the fuel cell system 24 within the battery 22, provide the electricity generated by the fuel cell system 24 to the electric motors 12A and/or 12B via the configurable inverters 28A and 28B, or some combination of the two. The battery 22 can be charged using electricity provided by the fuel cell system 24 via the power distribution system 26, which can then later be used to drive the electric motors 12A and/or 12B.

Again, as explained previously, the vehicle 10 may not include the fuel cell system 24 and may operate as an electric vehicle, hybrid electric vehicle, or plug-in hybrid electric vehicle. In those situations, electricity may be provided to the battery 22 from the electrical grid, regenerative braking, or other energy capture methodologies. Like the fuel cell system 24, the current provided by the battery 22 can be DC.

The vehicle 10 may include one or more controller(s) 20 that can control any of the components of the vehicle 10, such as the battery 22, the fuel cell system 24, and/or the power distribution system 26. The controller may be a single processor or may be multiple processors working in concert. In this example, the controller(s) 20 can control how much electricity is provided to the configurable inverters 28A and 28B, as well as control if electricity generated by the fuel cell system 24 is stored within the battery 22 or provided to the configurable inverters 28A and 28B. Further still, the controller(s) 20, either by being directly connected to the configurable inverters 28A and 28B or via the power distribution system 26, can control the direction and speed of the electric motors 12A and 12B based on a torque request initiated by an operator of the vehicle 10 or an autonomous and/or semi-autonomous vehicle system.

Regardless of whether the vehicle 10 includes the fuel cell system 24, electricity must be provided to the electric motors 12A and/or 12B to provide torque to the output shaft 14, which will be provided to the wheels 18A-18D via the transmission 16. The configurable inverters 28A and 28B, which may be substantially similar to each other, function to convert the current received from the power distribution system 26 into current that can drive the electric motors 12A and 12B. In one example, the current provided by the power distribution system 26 may be DC. The configurable inverters 28A and 28B can convert the current from a DC source, such as the power distribution system 26, into a three-phase AC output that can drive the electric motors 12A and/or 12B. However, it should be understood that the configurable inverters 28A and 28B given in this example can vary from application to application. For example, the configurable inverters 28A and 28B may be configured to convert the current from a DC source into an AC output instead of a three-phase AC output mentioned above.

In this example, the configurable inverters 28A and 28B include output lines 30A-34A and 30B-34B, respectively, that output AC electricity for each phase. In addition, the configurable inverters 28A and 28B include input lines 36A and 36B that provide information from the electric motors 12A and 12B, respectively. In one example, the input lines 36A and 36B are resolver lines that provide a signal indicating the degree of rotation for each electric motor 12A and 12B, respectively.

In addition to degree rotation information, the input lines 36A and 36B may also provide information regarding the position of each of the electric motors 12A and 12B with respect to each other. The information regarding the position of each of the electric motors 12A and/or 12B can indicate the relative position of each of the motors or may simply be a motor identifier that can be utilized to determine the position using an appropriate lookup table.

As stated previously, the electric motors 12A and 12B are connected to the output shaft 14 and substantially face each other. As such, when the electric motor 12A rotates the output shaft 14 clockwise, the electric motor 12B should rotate the output shaft 14 counterclockwise. If both electric motors 12A and 12B attempt to rotate the output shaft 14 in the same direction, the electric motors 12A and 12B will essentially be working against each other, potentially causing damage to the electric motors 12A and 12B, the output shaft 14, or other components of the vehicle 10.

Essentially, the electric motors 12A and 12B may have a default condition, wherein when three-phase power is provided to the three motor supply lines, the motor will rotate in one direction. As such, if the electric motors 12A and 12B are orientated such that they face the same direction, they will rotate the output shaft 14 in the same direction. However, if the electric motors 12A and 12B are facing away from each other or towards each other, they will attempt to rotate the output shaft 14 in opposite directions, essentially canceling each other out. Therefore, the configurable inverters 28A and 28B should be configured to appropriately provide three-phase AC power to the electric motors 12A and 12B to avoid such a situation.

Figure 2:
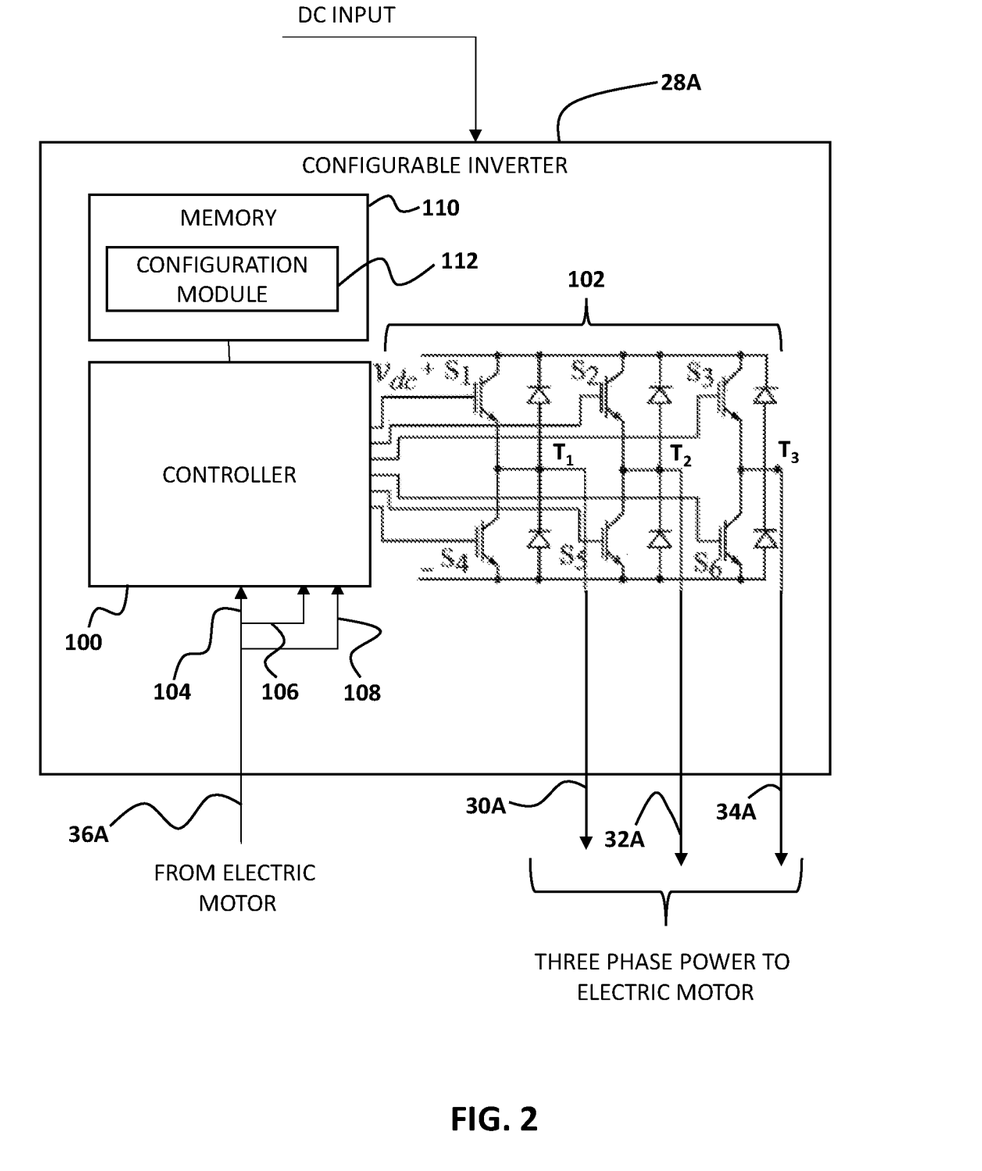
FIG. 2 is a more detailed block diagram of one example of a configurable inverter.

Referring to FIG. 2, a more detailed illustration of the configurable inverter 28A is shown. As stated previously, the configurable inverter 28A may be substantially similar to the configurable inverter 28B. So, any description provided regarding the configurable inverter 28A is equally applicable to the configurable inverter 28B. In this example, the configurable inverter 28A includes a controller 100, a power circuit 102, and a memory 110.

The controller 100 is in communication with the memory 110. The controller 100 may be a single processor or may be multiple processors working in concert. The memory 110 may be a random-access memory (RAM), read-only memory (ROM), a hard disk drive, a flash memory, or other suitable memory. The memory 110 may include a configuration module 112 that includes instructions.

When executed by the controller 100, these instructions cause the controller 100 to perform any one of the methodologies discussed in this specification. Broadly, the instructions of the configuration module 112 may cause the controller 100 to determine the position of the electric motor 12A that the configurable inverter 28A is connected to with respect to the other electric motor 12B. By determining the position of the electric motor 12A, the controller 100 can make sure that the power circuit 102 outputs the appropriate three-phase AC output to the electric motor 12A so that the electric motor 12A applies torque to the output shaft 14 in the expected direction.

The controller 100 is also in communication with the power circuit 102. The power circuit 102 functions to convert the DC input from the power distribution system 26 to a three-phase AC output provided to output lines 30A-34A. The power circuit 102, in this example, includes transistors $S_1$-$S_6$ acting as switches, wherein the transistors $S_1$-$S_6$ can be connected to one of three load terminals $T_1$-$T_3$, which are connected to output lines 30A-34A, respectively. The transistors $S_1$-$S_6$ are controlled by the controller 100. The controller 100 can control the direction and speed of the electric motor 12A by properly actuating the transistors $S_1$-$S_6$. Of course, it should be understood that the power circuit 102 shown in FIG. 2 is just one example of the power circuit that may be utilized.

The controller 100 may also be in communication with the input line 36A. The input line 36A, as explained earlier, may be referred to as a resolver line that can provide information regarding the rotational position of the electric motor 12A. In addition to providing rotational position information, the input line 36A can also provide the controller 100 with motor position information regarding the electric motor 12A. The motor position information can include information regarding the position of the electric motor 12A with respect to the other electric motor 12B. The position information may be in the form of an identifier that identifies if the electric motor 12A is a forward or rearward electric motor or may simply be an electric motor identifier that can be utilized, in combination with a lookup table, to determine which electric motor the configurable inverter 28A is connected to.

In one example, the input line 36A may have multiple lines connected to individual pins connected to a connector in communication with the controller 100. In addition to power, ground, and other lines, the input line 36A can include a rotational position line 104 and identifier lines 106 and/or 108. The rotational position line 104 may contain information regarding the rotational position of the electric motor 12A. The signal provided to the rotational position line 104 from the electric motor 12A may be in the form of an analog signal generated by one or more Hall effect sensors incorporated within the electric motor 12A.

The identifier lines 106 and/or 108 may be lines that provide the identity of the electric motor 12A or the position of the electric motor 12A with respect to the other electric motor 12B. In one example, the identifier line 106 may be grounded to indicate that the electric motor 12A is a forward electric motor. In this case, since the electric motor 12A is the forward electric motor, the identifier line 106 may be grounded. Conversely, if the configurable inverter 28A was connected to the electric motor 12B, which is the rearward electric motor, the identifier line 106 may be floating, while the identifier line 108 may be grounded.

However, it should be understood that information regarding the position or identity of the electric motor 12A provided to the configurable inverter 28A can be done in various ways and should not be limited to just the methodology described in this paragraph. For example, instead of identifier lines 106 and/or 108 selectively connected to an electrical ground, the identifier lines could be connected selectively to an electrical source. Further still, instead of identifier lines 106 and/or 108, transmission lines that transmit data serially can be utilized instead.

The configuration module 112 includes instructions that, when executed by the controller 100, causes the controller 100 to determine the motor position of the electrical motor 12A. As explained previously, this may be accomplished by identifier lines 106 and/or 108 to determine the position and/or identity of the electrical motor 12A. Based on this information, when the controller 100 receives a torque request command from another controller, such as the controller(s) 20, the controller 100 can provide the appropriate three-phase AC output to the output lines 30A-34A to drive the electric motor 12A at the appropriate speed and direction. More simply, by switching two of the outputs provided by output lines 30A-34A, the rotation of the electric motor 12A can be reversed. When two electric motors 12A and 12B are utilized, the configurable inverter 28A may switch at least two of the outputs provided by output lines 30A-34A. In contrast, the configurable inverter 28B utilized with the second electric motor 12B may not switch any outputs provided by output lines 30B-34B. By so doing, the output shaft 14 will be rotated in the same direction by both electric motors 12A and 12B.

As stated previously, the configurable inverter 28A is similar to the configurable inverter 28B connected to the electrical motor 12B. As such, the configurable inverter 28B can also determine the position and/or the identity of the electrical motor 12B with respect to the electrical motor 12A. When the configurable inverter 28B receives a torque command from the controller(s) 20, the configurable inverter 28B can drive the electric motor 12B so that it is appropriately synchronized with the other electrical motor 12A. In situations where the electrical motors 12A and 12B counteract each other because they are applying a rotational torque to the output shaft 14 in opposite directions can be avoided. Further still, situations where the electrical motors 12A and 12B are synchronized with each other but are operating in the reverse (i.e., they are causing the vehicle 10 to move backward as opposed to forward) can also be avoided as the identity and position of the electrical motors 12A and 12B can be determined.

The configurable inverters 28A and/or 28B because they are self-configuring, have the advantage that they can be connected to either of the electric motors 12A and/or 12B. During the manufacture of the vehicle 10 or the replacement of one of the configurable inverters 28A and/or 28B with a similar replacement, different inverters with different part numbers do not need to be utilized. Instead, a single type of configurable inverter can be utilized that automatically configures itself and causes the electrical motor to send the appropriate torque in the appropriate direction. This can reduce complexities regarding replacement and manufacture.

Figure 3:
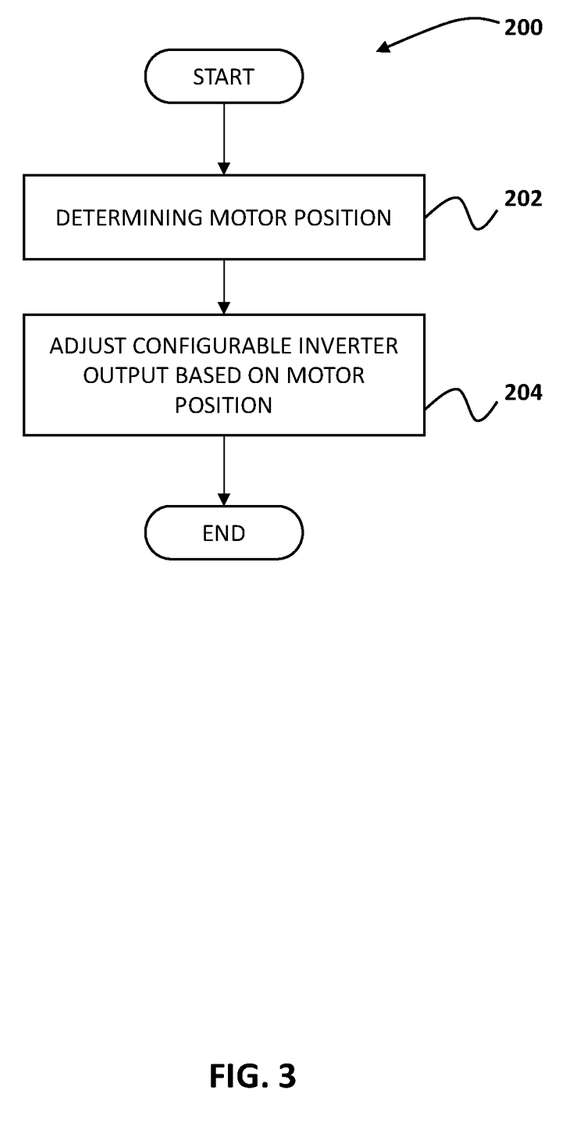
FIG. 3 illustrates a method for adjusting the output of an inverter based on the position of an electric motor with respect to another electric motor.

Referring to FIG. 3, a method 200 for providing power to an electric motor from an inverter is shown. The method 200 will be described from the viewpoint of the vehicle 10 of FIG. 1 and the configurable inverter 28A of FIG. 2. However, it should be understood that this is just one example of implementing the method 200. While method 200 is discussed in combination with the configurable inverter 28A, it should be appreciated that the method 200 is not limited to being implemented within the configurable inverter 28A but is instead one example of a system that may implement the method 200.

In step 202, the configurable inverter 28A determines the position of the electrical motor 12A with respect to the other electrical motor 12B. As explained previously, the electrical motor 12A and the electrical motor 12B are connected to the output shaft 14 and generally face each other. As such, for provided to the output shaft 14 by the electric motors 12A and 12B should be coordinated so that the electric motors 12A and 12B do not counteract or cause the vehicle 10 to move opposite the intended direction.

In one example, the configuration module 112 causes the controller 100 to determine the position of the electric motor 12A by receiving information from the input line 36A. The information from the input line 36A can include information that identifies the position or identity of the electric motor 12A. Using this information, the position of the electric motor 12A with respect to electric motor 12B can be determined.

In step 204, after the position of the electric motor 12A has been determined, the configuration module 112 may cause the controller 100 to modify the three-phase AC output provided to the output lines 30A-34A of the configurable inverter 28A to the electric motor 12A based on the previously determined position. Moreover, in one example, the controller 100 may actuate the switches $S_1$-$S_6$ of the power circuit 102 of the configurable inverter 28A to drive the electric motor 12A at the appropriate speed and direction. As such, the modification of the three-phase AC output provided to the output lines 30A-34A is such that the amount of and direction of torque provided to the output shaft 14 in response to a torque request can be coordinated with a three-phase AC output provided to another electric motor, such as the electric motor 12B.

It should be appreciated that any of the systems described in this specification can be configured in various arrangements with separate integrated circuits and/or chips. The circuits are connected via connection paths to provide for communicating signals between the separate circuits. Of course, while separate integrated circuits are discussed, the circuits may be integrated into a common integrated circuit board in various embodiments. Additionally, the integrated circuits may be combined into fewer integrated circuits or divided into more integrated circuits.

In another embodiment, the described methods and/or their equivalents may be implemented with computer-executable instructions. Thus, in one embodiment, a non-transitory computer-readable medium is configured with stored computer-executable instructions that, when executed by a machine (e.g., processor, computer, controller, and so on), cause the machine (and/or associated components) to perform the method.

While for purposes of simplicity of explanation, the illustrated methodologies in the figures are shown and described as a series of blocks, it is to be appreciated that the methodologies are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional blocks that are not illustrated.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A combination of hardware and software can be a processing system with computer-usable program code that, when being loaded and executed, controls the processing system such that it carries out the methods described herein. The systems, components, and/or processes also can be embedded in a computer-readable storage, such as a computer program product or other data programs storage device, readable by a machine, tangibly embodying a program of instructions executable by the machine to perform methods and processes described herein. These elements can also be embedded in an application product that comprises all the features enabling the implementation of the methods described herein and, when loaded in a processing system, can carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Examples of such a computer-readable medium may include, but are not limited to, a floppy disk, a flexible disk, a hard disk, a magnetic tape, other magnetic medium, an ASIC, a graphics processing unit (GPU), a CD, other optical medium, a RAM, a ROM, a memory chip or card, a memory stick, and other media from which a computer, a processor, a controller, or another electronic device can read. In the context of this document, a computer-readable storage medium may be any tangible medium that can contain or store a program for use by or in connection with an instruction execution system, apparatus, or device.

The following includes definitions of selected terms employed herein. The definitions include various examples and/or forms of components that fall within the scope of a term and may be used for various implementations. The examples are not intended to be limiting. Both singular and plural forms of terms may be within the definitions.

References to "one embodiment," "an embodiment," "one example," "an example," and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Module," as used herein, includes a computer or electrical hardware component(s), firmware, a non-transitory computer-readable medium that stores instructions, and/or combinations of these components configured to perform a function(s) or an action(s), and/or to cause a function or action from another logic, method, and/or system. Module may include a microprocessor controlled by an algorithm, a discrete logic (e.g., ASIC), an analog circuit, a digital circuit, a programmed logic device, a memory device including instructions that, when executed, perform an algorithm, and so on. In one or more embodiments, a module may include one or more CMOS gates, combinations of gates, or other circuit components. Where multiple modules are described, one or more embodiments may include incorporating the multiple modules into one physical module component. Similarly, where a single module is described, one or more embodiments distribute the single module between multiple physical components.

Additionally, module, as used herein, includes routines, programs, objects, components, data structures, and so on that perform tasks or implement data types. In further aspects, a memory generally stores the noted modules. The memory associated with a module may be a buffer or cache embedded within a processor, a controller, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), as a graphics processing unit (GPU), or as another suitable hardware component that is embedded with a defined configuration set (e.g., instructions) for performing the disclosed functions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A vehicle comprising:
    a first electric motor connected to an output shaft and configured to rotate the output shaft;
    a second electric motor connected to the output shaft and configured to rotate the output shaft;
    a first configurable inverter connected to the first electric motor and configured to output a first three-phase alternating current (AC) to the first electric motor, the first configurable inverter having a first configurable inverter controller and a first configurable inverter memory with instructions that, when executed by the first configurable inverter controller causes the first configurable inverter controller to determine a position of the first electric motor and adjust the first three-phase AC output based on the position of the first electric motor, the position of the first electric motor and including at least one of facing toward the second electric motor, facing away from the second electric motor, and facing in a same direction as the second electric motor; and
    a second configurable inverter connected to the second electric motor and configured to output a second three-phase AC to the second electric motor, the second configurable inverter having a second configurable inverter controller and a second configurable inverter memory with instructions that, when executed by the second configurable inverter controller causes the second configurable inverter controller to determine a position of the second electric motor and adjust the second three-phase AC output based on the position of the second electric motor, the position of the second electric motor including at least one of facing toward the first electric motor, facing away from the first electric motor, and facing in the same direction as the first electric motor.

2. The vehicle of claim 1, wherein the first electric motor and the second electric motor face towards each other.

3. The vehicle of claim 1, wherein the first electric motor and the second electric motor face away from each other.

4. The vehicle of claim 1, wherein the vehicle is one of a fuel cell vehicle, an electric vehicle, a plug-in hybrid electric vehicle, and a hybrid electric vehicle.

5. The vehicle of claim 1, wherein:
    the first configurable inverter memory further includes instructions that, when executed by the first configurable inverter controller, causes the first configurable inverter controller to determine the position of the first electric motor using a first motor position identifier provided by the first electric motor; and
    the second configurable inverter memory further includes instructions that, when executed by the second configurable inverter controller, causes the second configurable inverter controller to determine the position of the second electric motor using a second motor position identifier provided by the second electric motor.

6. The vehicle of claim 1, wherein:
    the first configurable inverter memory further includes instructions that, when executed by the first configurable inverter controller, causes the first configurable inverter controller to determine the position of the first electric motor using a first motor identifier provided by the first electric motor and a lookup table that cross-references the first motor identifier with the position of the first electric motor; and
    the second configurable inverter memory further includes instructions that, when executed by the second configurable inverter controller, causes the second configurable inverter controller to determine the position of the second electric motor using a second motor identifier provided by the second electric motor and the lookup table that cross-references the second motor identifier with the position of the second electric motor.

7. The vehicle of claim 1, further comprising a powertrain mechanically coupled to the output shaft that directs power received from the output shaft to one or more wheels of the vehicle.

8. A configurable inverter comprising:
    a controller;
    a power circuit in communication with the controller and configured to output a three-phase alternating current (AC) to a first electric motor; and
    a memory in communication with the controller, the memory having instructions that, when executed by the controller, causes the controller to determine a position of the first electric motor with respect to a second electric motor and adjust the three-phase AC output by the power circuit based on the position of the first electric motor with respect to the second electric motor including at least one of facing toward the second electric motor, facing away from the second electric motor, and facing in a same direction as the second electric motor.

9. The configurable inverter of claim 8, wherein the first electric motor and the second electric motor are connected to an output shaft.

10. The configurable inverter of claim 9, wherein the first electric motor and the second electric motor face towards each other.

11. The configurable inverter of claim 9, wherein the first electric motor and the second electric motor face away from each other.

12. The configurable inverter of claim 9, wherein the output shaft is connected to a powertrain that directs power received from the output shaft to one or more wheels of a vehicle.

13. The configurable inverter of claim 8, wherein the memory further includes instructions that, when executed by the controller, causes the controller to determine the position of the first electric motor using a first motor position identifier provided by the first electric motor.

14. The configurable inverter of claim 8, wherein the memory further includes instructions that, when executed by the controller, causes the controller to determine the position of the first electric motor using a first motor identifier provided by the first electric motor and a lookup table that cross-references the first motor identifier with the position of the first electric motor.

15. A method comprising steps of:
determining, using a controller, a position of a first electric motor with respect to a second electric motor based on information provided to the controller from at least one of the first electric motor and second electric motor; and
adjusting a three-phase AC output by a power circuit to the first electric motor based on the position of the first electric motor with respect to the second electric motor, the position including at least one of facing toward the second electric motor, facing away from the second electric motor, and facing in a same direction as the second electric motor.

16. The method of claim 15, wherein the first electric motor and the second electric motor are connected to an output shaft.

17. The method of claim 16, wherein the first electric motor and the second electric motor face towards each other.

18. The method of claim 16, wherein the first electric motor and the second electric motor face away from each other.

19. The method of claim 15, further comprising a step of determining the position of the first electric motor using a first motor position identifier provided by the first electric motor to the controller.

20. The method of claim 15, further comprising a step of determining the position of the first electric motor using a first motor identifier provided by the first electric motor and a lookup table that cross-references the first motor identifier with the position of the first electric motor.

* * * * *